(12) United States Patent
Wyseur et al.

(10) Patent No.: US 12,100,278 B2
(45) Date of Patent: Sep. 24, 2024

(54) LOCAL DECISION MAKING

(71) Applicant: NAGRAVISION SARL, Cheseaux-sur-Lausanne (CH)

(72) Inventors: Brecht Wyseur, Cheseaux-sur-Lausanne (CH); Jean-Bernard Fischer, Cheseaux-sur-Lausanne (CH)

(73) Assignee: NAGRAVISION SARL, Cheseaux-sur-Lausanne (CH)

(*) Notice: Subject to any disclaimer, the term of this patent is extended or adjusted under 35 U.S.C. 154(b) by 477 days.

(21) Appl. No.: 17/271,320

(22) PCT Filed: Aug. 30, 2019

(86) PCT No.: PCT/EP2019/073238
§ 371 (c)(1),
(2) Date: Feb. 25, 2021

(87) PCT Pub. No.: WO2020/043890
PCT Pub. Date: Mar. 5, 2020

(65) Prior Publication Data
US 2021/0256824 A1    Aug. 19, 2021

(30) Foreign Application Priority Data
Aug. 30, 2018 (EP) .................... 18306150

(51) Int. Cl.
*G08B 13/196* (2006.01)
*H04L 9/40* (2022.01)

(52) U.S. Cl.
CPC . *G08B 13/19667* (2013.01); *G08B 13/19602* (2013.01); *G08B 13/19654* (2013.01); *G08B 13/19656* (2013.01); *H04L 63/0442* (2013.01)

(58) Field of Classification Search
CPC ........ G08B 13/19667; G08B 13/19602; G08B 13/19654; G08B 13/19656; H04L 63/0442
(Continued)

(56) References Cited

U.S. PATENT DOCUMENTS

2016/0105402 A1\* 4/2016 Soon-Shiong ...... H04L 63/0428
713/164
2017/0293913 A1\* 10/2017 Gulak ................ G06Q 20/3829
(Continued)

FOREIGN PATENT DOCUMENTS

EP         2 538 343 A1   12/2012
WO    WO 2016/051122 A1   4/2016

OTHER PUBLICATIONS

International Search Report and Written Opinion dated Oct. 29, 2019 for International PCT Application No. PCT/EP2019/073238; 13 pages.
(Continued)

*Primary Examiner* — Frantz B Jean
(74) *Attorney, Agent, or Firm* — POLSINELLI LLP

(57) ABSTRACT

The present disclosure relates to the use of cryptographic techniques to facilitate local decision making at a gateway device (120) interfacing between an operator device (110) and edge devices (130), for example as can be found in Internet of Things infrastructures. Local decision making is facilitated in the context of end to end encryption of data between the edge device and operator device by enabling a function of the data to be computed at the gateway (120) without decrypting the data, for example using Functional Encryption (FE). The gateway determines an action based on the computed function, for example whether to transmit the data to the operator device (110). Examples of edge devices are video surveillance cameras or utility consumption meters but the disclosure is applicable to any edge
(Continued)

device that produces data to be transmitted with end to end encryption. The disclosure is also not limited to IoT infrastructures.

13 Claims, 5 Drawing Sheets

(58) Field of Classification Search
USPC .......................................................... 348/159
See application file for complete search history.

(56) References Cited

U.S. PATENT DOCUMENTS

| | | |
|---|---|---|
| 2018/0019983 A1* | 1/2018 | Tissot .................... G06F 21/602 |
| 2018/0067779 A1 | 3/2018 | Pillalamarri et al. |
| 2019/0097783 A1* | 3/2019 | Tan Bergström ....... H04L 43/16 |
| 2019/0306124 A1* | 10/2019 | Bild ...................... H04L 9/0833 |
| 2021/0336839 A1* | 10/2021 | He .......................... H04L 41/18 |

OTHER PUBLICATIONS

European Search Report dated Feb. 14, 2019 for European Patent Application No. 18306150.6; 7 pages.

\* cited by examiner

LOCAL DECISION MAKING

The present disclosure relates to decision making in a communication system in which an operator device is in communication with gateway devices connecting the operator to edge devices, for example IoT sensors such as smart meters or video cameras.

CROSS-REFERENCES TO RELATED APPLICATIONS

This application is a U.S. National Stage of PCT Application No. PCT/EP2019/073238, filed Aug. 30, 2019, which claims the priority benefit of European Patent Application No. 18306150.6, filed on Aug. 30, 2018, both of which are incorporated herein by reference in their entirety for all purposes.

BACKGROUND

The Internet of Things (IoT) is described by ENISA as a cyber-physical ecosystem of interconnected sensors and actuators, which enable decision making. In industry, there is a trend towards massive collection of data and applying analytics to the data for improving industrial processes and system operations. In many cases, automation of decision making based on aggregated data becomes inevitable for enabling safe operation of systems.

A typical network topology for data collection is presented in FIG. 6, in which, on the right hand side, there are sensors and actuators. These usually connect to an IoT Edge Gateway which collect the information and transfer this to a backend. Such a backend may be a cloud-based backend (e.g., running on AWS) which is able to perform analytics.

The network connection between sensors and the gateway is usually a direct cable connection or local wireless with high bandwidth and low latency. The network connection between the gateway and the back-end is typically a LTE/4G or a LPWAN (Low Power Wireless Area Network) like NB-IoT or LoRa, which introduces bandwidth and latency constraints.

For security, privacy or compliance reasons, data transmitted in the network often needs to be end-to-end encrypted. That means that data needs to be encrypted at the sensor or actuator side and only be decrypted by the back-end. No intermediate entity is allowed be able to decrypt the data. As a result of this requirement, known IoT networks that provide end-to-end encryption must perform all processing at the backend.

BRIEF DESCRIPTION OF THE DRAWINGS

Specific embodiments are described with reference to the accompanying drawings, in which.

DETAILED DESCRIPTION

Figure 6:
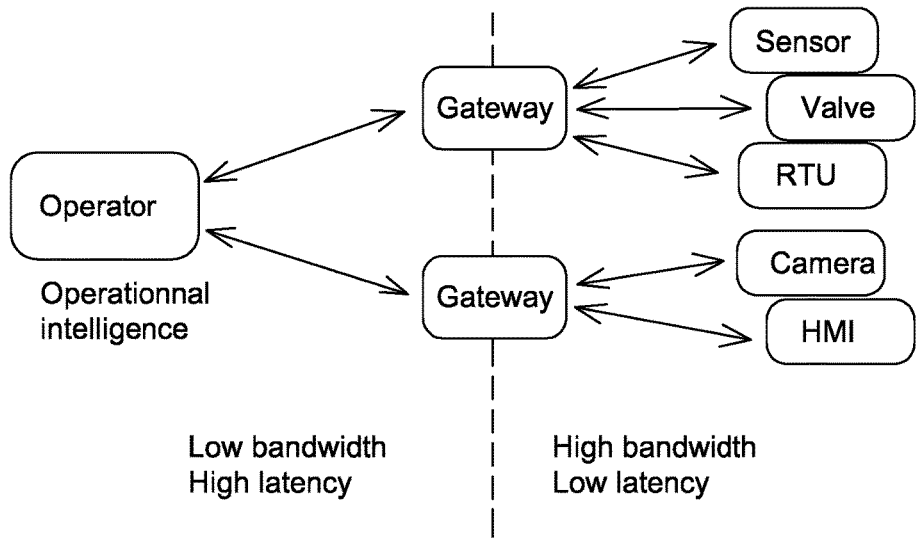
FIG. 6 illustrates a known IoT communications network.

In overview, the present disclosure relates to the use of cryptographic techniques to facilitate local decision making at a gateway device interfacing between an operator device and edge devices, for example as can be found in Internet of Things infrastructures. Local decision making is facilitated in the context of end to end encryption of data between the edge device and operator device by enabling a function of the data to be computed without decrypting the data, for example using Functional Encryption (FE). Examples of edge devices are video surveillance cameras or utility consumption meters, but the present disclosure is applicable to any other kind of edge device that produces data to be transmitted with end to end encryption.

In an aspect of the disclosure, a method of local decision making in a communications system is disclosed. The communications system comprises an operator device in communication with a plurality of gateway devices and a plurality of edge devices in communication with each gateway device. The method comprises receiving encrypted data at a gateway device from an edge device for transmission to the operator device. The encrypted data is encrypted with a public key such that it can be decrypted, for example by the operator device with a corresponding private key, for example held at the operator device, and a function of the data can be computed without the private key. The function may be a sum or average of data values or magnitudes. In some implementations, the function returns a value indicating whether a sum of magnitudes of the data exceeds a threshold value.

The gateway device stores an operator configured to compute the function of some or all of the data from the encrypted data without decrypting the encrypted data. The gateway device does not have access to the private key. The method further comprises applying, at the gateway device, an operator to the encrypted data to compute a value of the function of the input data without decrypting the encrypted data and determining, at the gateway device, an action to be taken based on the value. Once an action has been determined, the determined action is taken.

The action may comprise deciding whether or how to transmit some or all of the encrypted input data to the operator. The method may comprise receiving multiple instances of encrypted data from respective edge devices and computing a respective value of the function for each instance of encrypted data. The method may comprise selecting which of the instances to transmit and how to transmit them based on the values. For example, one or more instances of the data may be selected to be transmitted and the remaining instances not to be transmitted based on the computed values. The instances to be transmitted may be transmitted with a bandwidth requirement or compression setting based on the computed values. In some implementations, all instances are transmitted with a bandwidth requirement or compression setting based on the values. Alternatively or additionally, a determination may be made based on the computed values which instances of the encrypted data to store at the gateway device and at what space requirements or quality. The determination based on value(s) may be made for each instance based on the respective value alone, or based on the respective value and the values of other instances, for example based on comparison of the respective value with other values or on a sample measurement computed for other values.

In some use cases, the edge device or devices comprise a video camera and the encrypted input data comprises encrypted video data and encrypted motion data indicative of motion in frames of the video data, such as motion vectors. Motion vectors indicate for blocks of samples an offset for each block between two frames. In this case, the function may comprise a function of the motion data indicative of the amount of motion in frames of the video. For example, the function may return an average magnitude of motion vectors or an indicator whether this average magnitude or any magnitude exceeds a threshold value or not. The determining may comprise selecting the video data to transmit (e.g. from which edge device or devices) and how to transmit it. In some cases, the action may comprise selecting a quality of video data to be transmitted to the operator based on the value. This may be done by selecting an appropriate quality stream if the video data comprises multiple streams with different quality or compressing a video stream. In some cases, alternatively or additionally, the determination is which video data to store in the gateway device (from which edge device or devices) and/or at which quality.

The action may comprise sending a control signal to the edge device and/or sending an alarm signal to the operator device. For example, the method may comprise receiving instances of encrypted data from respective edge devices and computing a respective value of the function for each instance of encrypted data and determining the action to be taken based on the computed values, wherein the action comprises sending a control signal to one or more edge devices and/or sending an alarm signal to the operator device. Again, the determination may be based on individual respective values or on comparing respective values against other values.

In some use cases, the edge device or devices comprise a utility consumption meter and the encrypted input data comprises utility consumption data. In these use cases, the function may compute an average of consumption values or return an indication whether an average consumption value exceeds a threshold. If the computed value or values indicate that one of the edge devices has exceeded a safe consumption level or that the connected edge devices indicate cumulative over-consumption by a number of households containing the connected edge devices the gateway device may send a signal to one or more of the edge devices to throttle consumption or may alert the operator device as to a condition to be addressed in the utility network.

In a further aspect, a gateway device for use in a communications system is disclosed. The communications system comprises an operator device in communication with a plurality of gateway devices and a plurality of edge devices in communication with each gateway device, wherein the gateway device is configured to implement a method as described above. The gateway device comprises a memory storing computer instructions that, when run on a processor implement methods as described above; a communications interface for receiving the encrypted input data from an edge device and for transmitting the encrypted data to an operator device; and a processor configured to execute the computer instructions to implement the method.

In yet a further aspect, a communications system comprising an operator device in communication with a plurality of gateway devices as described is disclosed, together with a plurality of edge devices in communication with each gateway device. The connections between the gateway and edge devices may have higher bandwidth and/or shorter latency than connections between the edge devices and the operator device.

In some implementations, the data is encrypted using Functional Encryption (FE), which enables a function of encrypted data to be computed without decrypting the data, as described below.

Before turning to specific embodiments, it will be expedient to provide some background on Functional Encryption in the context of other encryption schemes.

Conventional encryption schemes (like for example AES, RSA, ECC) are built such that key holders can encrypt and decrypt information in a way that no third party can obtain information on the plaintext. They are built only to be able to perform encrypt/decrypt operations in secure and efficient way. They are all or nothing nature regarding security: when you have the corresponding key, you can decrypt the ciphertext. When you don't have the corresponding key, you can't do anything.

Homomorphic Encryption Schemes are schemes that have the additional property that it is possible to do something with the ciphertext—even without the corresponding key. For example, given a ciphertext Enc(A) corresponding to A, and a ciphertext Enc(B) corresponding to plaintext B, it is possible to operate on those ciphertexts and by doing so operate on the underlying plaintext—without revealing that plaintext. For example, Enc(A)*Enc(B)=Enc(A+B). This makes it possible to offload computations to a third party, without risking to disclose any information to that third party. The encrypted data is still in two distinct states: available or hidden.

Functional Encryption Schemes aim to address the above limitations. The goal is to allow a partial access to encrypted data, with fine-grained control of that access. A Functional Encryption (FE) system augments a classical encryption system with the capability of functional decryptability. Functional decryptability means that decryption keys are associated with a function f (or, more generally, an operator or a program) and when applied to a ciphertext Enc(m), the decryption yields f(m). This addresses the all or nothing problem and avoids the need for the (global) private key to obtain the result. With Functional Encryption, you could offload computation to a $3^{rd}$ party, and associate the $3^{rd}$ party's private keys with a function f that is say "compute average". As such, that $3^{rd}$ party can obtain the average of the dataset—even though the dataset is provided in encrypted form. Provided Enc(A), Enc(B), Enc(C), the 3 rd party can obtain AVG(A,B,C) without having any other information on A,B,C revealed. Thus, the third party obtains partial information on the provided ciphertexts.

More formally, FE allows to compute a function F(x0, x1,x2, . . . ) given the encrypted data E(x0), E(x1), E(x2), . . . and a specially crafted operator which we denote as E(F). That is, F(x0, x1, x2, . . . )=E(F)[E(x0), E(x1), E(x2), . . . ]. The mapping from F to E(F) can only be crafted by an authorized entity (holding the private key) because else an attacker could craft arbitrary functions F that would leak arbitrary information on the encrypted data. An example of a function F is the inner product of a vector of data values x0, x1, x2, etc with a test vector, see Simple Functional Encryption Schemes for Inner Products, M Abdalla et al, Cryptology ePrint Archive, Report 2015/017, incorporated by reference herein.

Figure 1:
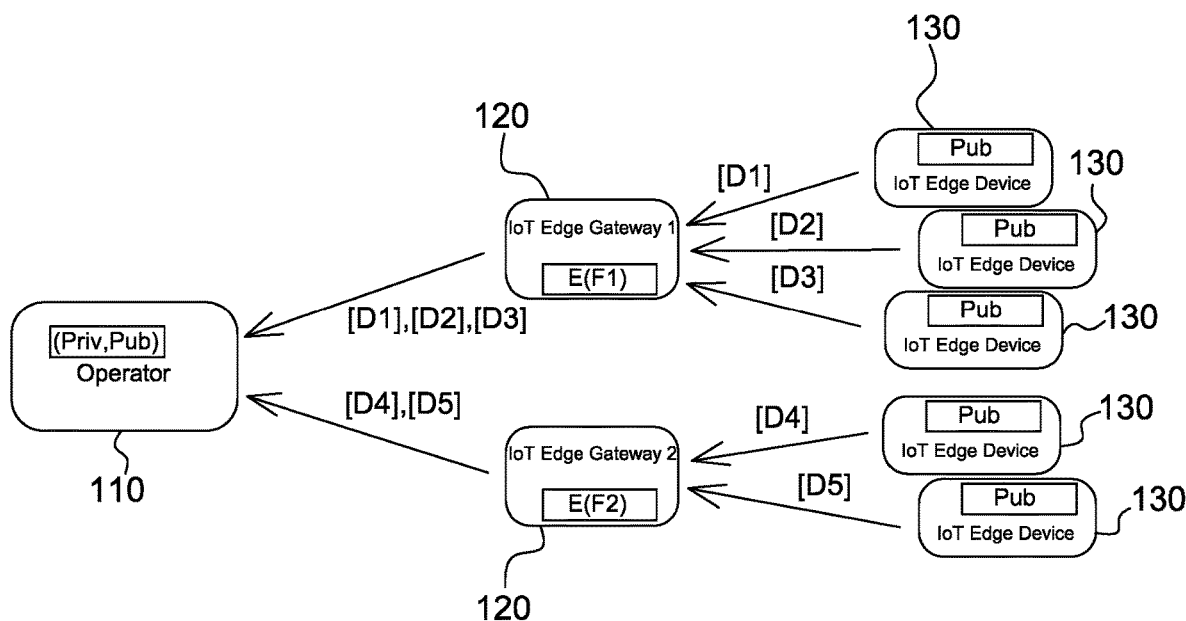
FIG. 1 illustrates an IoT communications network for local decision making.

With reference to FIG. 1, a communication network of the type described above with reference to FIG. 7 is formed by an operator device 110 connected to a plurality of edge devices 130, such as sensors and/or actuator devices (or combined sensor and actuator devices), via a number of gateway devices 120. Each gateway device 120 connects to a number of edge devices 130 to connect the edge devices 130 to the operator device 110. In order to ensure end-to-end encryption of data sent by the edge devices 130 until it reaches the operator device 110, the operator device has a public and private key pair. The public key is provided to the edge devices 130 so that they can encrypt the data and the data can be decrypted at the operator device 110. In addition, gateway devices 120 are provided with an operator (or program), which, when applied to the encrypted data, yields the value of a function of the data that has been encrypted, exploiting the properties of FE as discussed above.

Figure 2:
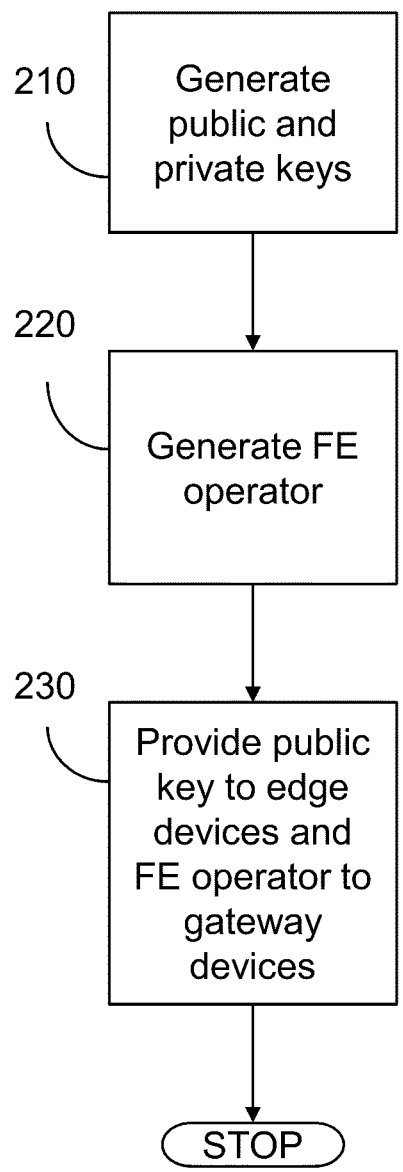
FIG. 2 illustrates a key generation process.

Operation of the operator device to set up data transfer is now described with reference to FIG. 2. At a step 210, the operator device 110 generates public and private keys as discussed above, and also generates the FE operator discussed above, at a step 220. At step 230 the keys are distributed to the edge devices 130 and the operator is distributed to the gateway devices 120. It will be understood that the operator device 110 also has other functionality not described here, and in particular is configured to receive the encrypted data from the gateway devices 120 and to process it.

Figure 3:
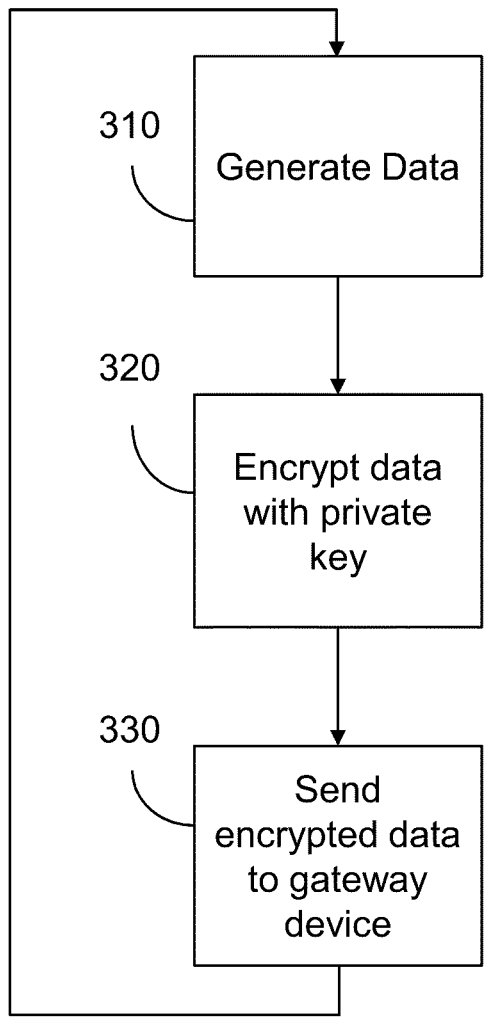
FIG. 3 illustrates a data sending process and an edge device in the IoT communications network.

Operation of an edge device is described with reference to FIG. 3. At step 310, the edge device generates data, for example from as sensor such as a video camera or a smart consumption meter, such as an electricity meter. The data is encrypted with the private key at step 320 and sent to the gateway device at step 330. The process then loops back to step 310 to generate more data and the process starts over.

Figure 4:
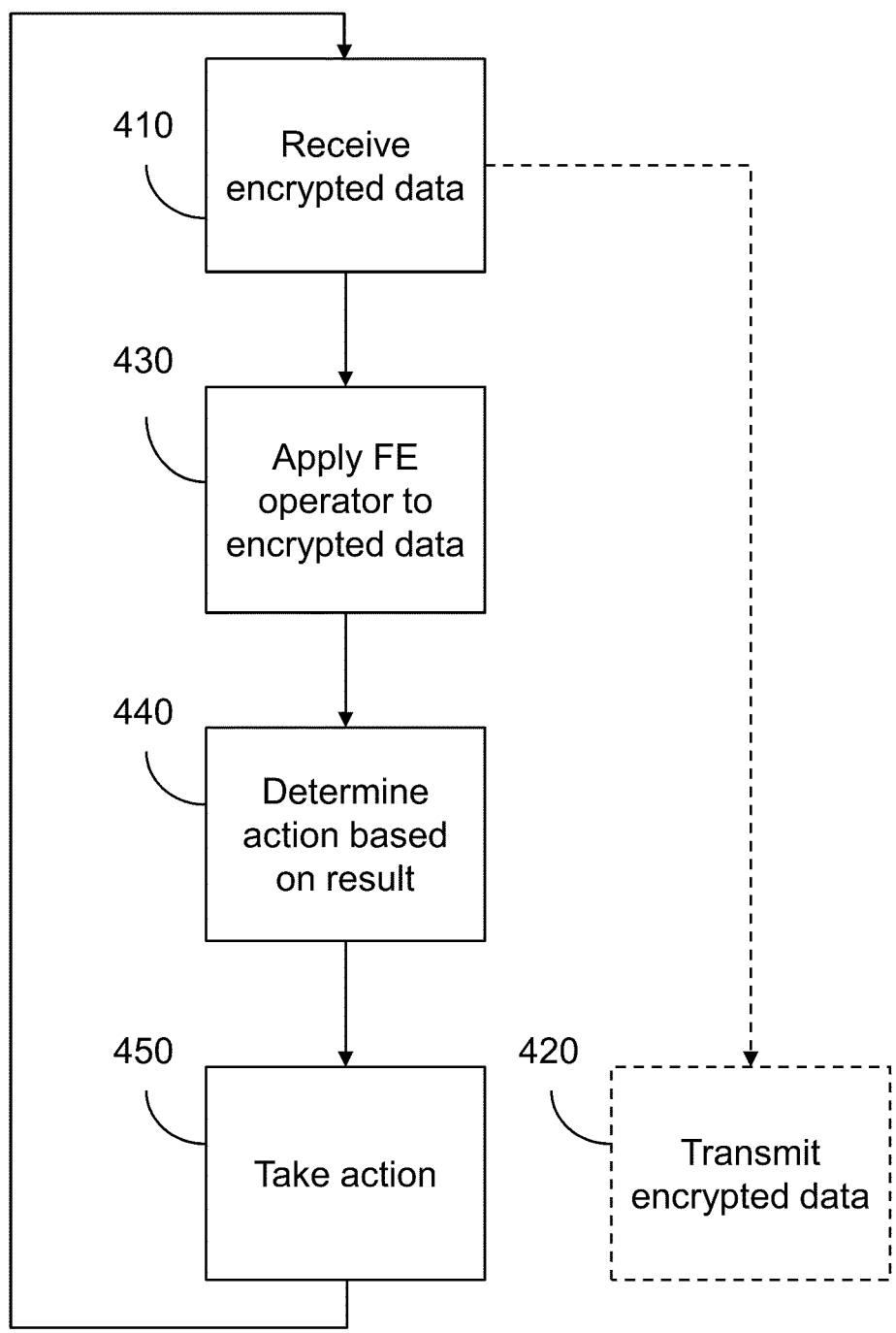
FIG. 4 illustrates a data processing process at a gateway device in the IoT communications network.

Operation of the gateway device is now described with reference to FIG. 4. At step 410 the gateway device 120 receives encrypted data from an edge device 130 connected to the gateway device 120. The encrypted data is transmitted onwards to the operator device 110 at step 420, although in some implementations the transmitting step depends on the outcome of the remaining steps of the process and therefore occurs after these, or not at all, depending on the outcome of the remaining steps. At step 430, the gateway device 120 applies an FE operator to the received encrypted data in order to compute a value of a function of the data, without decrypting the data. At step 440, an action to be taken is determined based on the computed value and the action is taken at step 450. Subsequently, the process loops back to step 410 to receive further encrypted data. In some implementations in which the action is conditional on the computed values of data received from some or all of the edge devices 130 connected to the gateway device 120, step 410 accumulates data from the devices in question which is then processed at step 430 to extract the respective values of the function and the determination at step 440 is then based on the extracted values, for example on an average of the extracted values, or respective actions are determined based on respective values relative to the other values or a measure like an average of the other values.

Depending on the use case, the action may be the sending of a control signal to one or more of the edge devices 130 connected to the gateway device 120 if the computed value (or a measure using the computed values, such as an average) exceeds a threshold, absolute or relative to other values or measures thereof. For example, in a smart meter infrastructure, in which the gateway device 120 is often referred to as a data concentrator, this may be useful to send a shutdown signal to the smart meter if a high consumption value indicating a leak is detected. For example, in such a use case, the operator may produce a result that indicates if any of the received data values exceed a threshold, thereby keeping any actual consumption data from being known to the gateway device 120. Similarly, an alert signal indicating general overconsumption and hence supply stray may be sent to the operator 110 if a threshold number of smart meters are sending consumption values above a threshold. In this way an alarm can be generated more quickly and closer to the source of the problem.

In another use case, the edge devices 130 form part of a video surveillance network and each comprises a video camera generating one or more surveillance video streams. In order to manage bandwidth requirement for sending video data from a number of edge devices to the operator 110, the gateway requires access to the data to determine which streams from which edge device 120, at which quality, to transmit and/or to store.

Typically, each camera will have three streams: 4K, HD and a sequence of static MJPEG images. It is thus desirable for the gateway device 120 to determine which of the three streams to transmit and/or store for each camera/edge device 130. In one implementation, the selection is based on detection of movement in each video, which can exploit the motion vectors present in H.264 and other types of video streams. The motion vectors can be seen as a large set of coordinates. When these equal the zero vector, there is no movement. When movement is present, the magnitude of the motion vector is indicative of the presence of movement. The magnitude of the motion vector can be tested using an inner product with a test vector, for example (1,1,1,1, 1,1 . . . ,1). A FE operator or program for computing an inner product without decryption has been described in Adalla et al referred to above and the inner product can be implemented to test for movement as described below. Other FE schemes can of course equally be used. Specifically, to test for movement in a stream produced by an edge device 130, an operator computing the inner product INNER(motion_vector,test_vector) is applied to the encrypted video stream data, or a separated stream as described below. If the result is larger than a threshold value, sufficient movement is considered to have been detected and the data from the corresponding edge device is prioritised.

Motion vectors are sets of numbers used in the encoding process and describe movement of coding blocks (macro blocks or smaller) in a frame of the video relative to a reference frame. See Szczerba, K., Forchhammer, S., Stottrup-Andersen, J., & Eybye, P. T. (2009). Fast compressed domain motion detection in H.264 video streams for video surveillance applications. In Proceedings, AVSS (pp. 478-483). IEEE. DOI: 10.1109/AVSS.2009.78 and also A Survey of H.264 AVC/SVC Encryption, Thomas Stutz and Andreas Uhl, Technical Report 2010-10, Universitat Salzburg, December 2010, both incorporated by reference herein, for a description of motion vectors. In a simple example, motion may be detected by averaging of the components of the motion vector and appropriate thresholding, as described above. However, more sophisticated processing may be employed as well, in some embodiments, for example to fill in missing motion vectors and/or provide a confidence measure whether motion vectors represent true motion or merely encoding artefacts, for example as described in Szczerba et al referenced above.

Motion vectors may be present in known locations in the stream and can therefore be extracted by an appropriately designed FE operator. In some embodiments, encrypted motion vectors may be placed in known locations in free payload blocks in the stream. In either case, motion vectors may be extracted from the stream after receiving the stream and prior to applying the FE operator to the extracted motion vectors, or the FE operator may implement the extraction and averaging in one operation. In other embodiments, encrypted motion vectors may be transmitted and received in a separate stream, optionally with identifiers to link each vector to the relevant frame so they can be used later for decoding once the stream(s) have been decrypted. Again, the FE operator may operate on extracted encrypted motion vectors or handle the extraction and averaging in one operation, Depending on the implementation, only prioritised data is transmitted to the operator device, with the remaining data being discarded, or the prioritized data is transmitted at a higher bitrate or quality, for example transmitting the 4K or HD stream for prioritized data and transmitting the MJPEG stream for the remaining data. In some implementations in which the data is stored by the gateway device 120, the detected amount of movement (or the movement amount meeting a threshold condition as described above) is used to decide whether, or at which resolution or quality, to store data from each edge device 130. In some implementation a decision is made edge device by edge device, with data from each edge device 130 that meets a threshold condition on movement being transmitted/recorded, for example, while in other implementations the criterion is a relative one, with the top 10, say, of data from each edge device 130 in terms of movement being transmitted or stored, for example, or data associated with higher than average motion being transmitted in another example.

Figure 5:
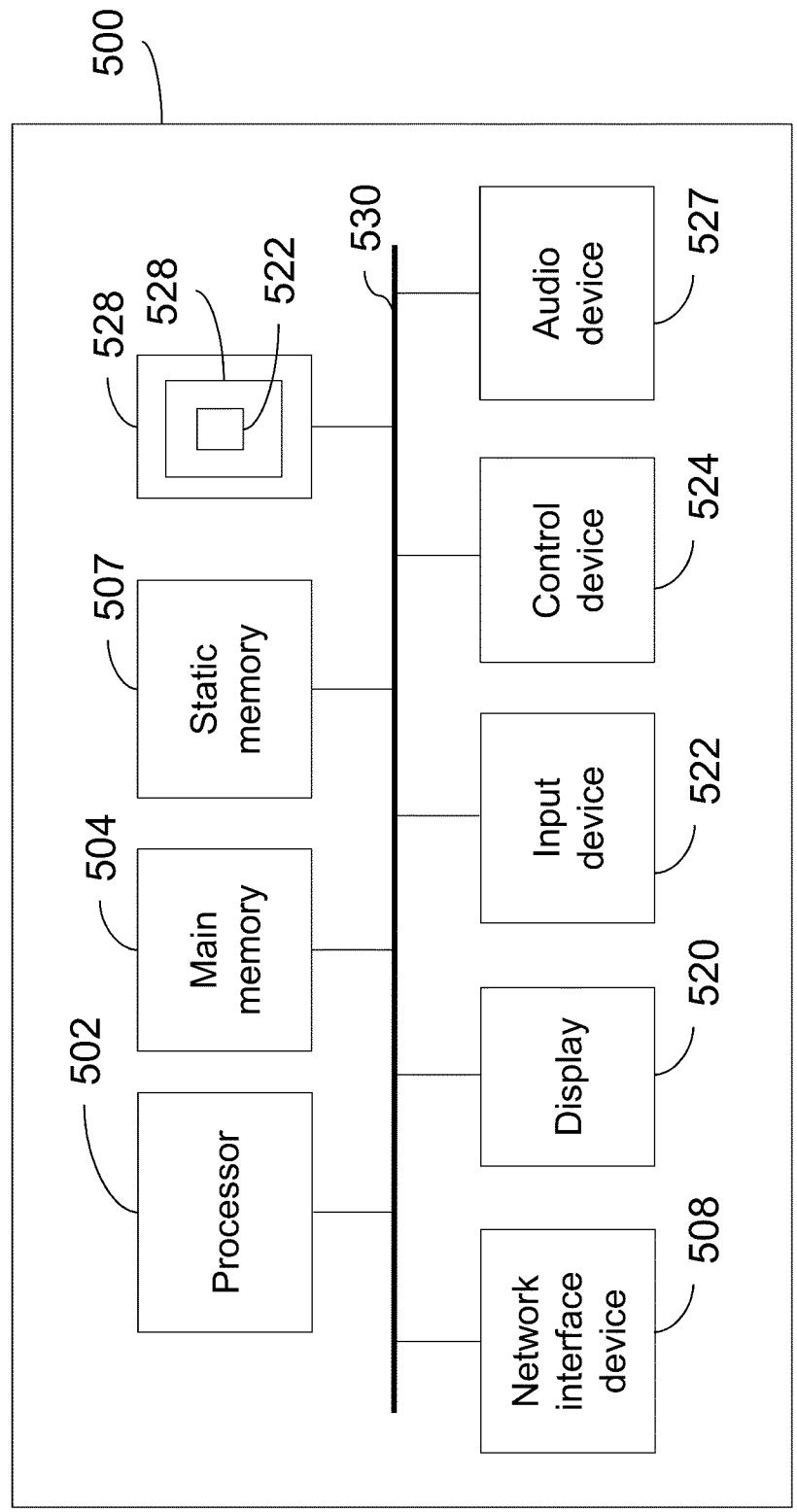
FIG. 5 illustrates a computing device for implementing disclosed processes.

The methods described above may be implemented in various computing infrastructures, general or application specific. For example, while the operator device 110 is likely to be implemented in general purpose server hardware, and the gateway device 120 is likely to be implemented in a lightweight general computing platform like a Raspberry Pi™, the method at the edge device 130 is more likely to be implemented in embedded hardware, for example as part of a video camera or smart meter. FIG. 5 illustrates a block diagram of one implementation of a computing device 500 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 522) for performing the operations and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard or touchscreen), a cursor control device 514 (e.g., a mouse or touchscreen), and an audio device 516 (e.g., a speaker).

The data storage device 518 may include one or more machine-readable storage media (or more specifically one or more non-transitory computer-readable storage media) 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying", "computing", "sending", "transmitting". "applying" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of local decision making in a communications system comprising an operator device in communication with a plurality of gateway devices and a plurality of edge devices, each edge device of the plurality of edge devices in communication with a respective gateway device of the plurality of gateway devices, the method comprising:
receiving encrypted data at a gateway device from an edge device for transmission to the operator device, wherein the encrypted data is encrypted with a public key such that the encrypted data can be decrypted with a corresponding private key and a function of the data can be computed without the private key, wherein the gateway device does not have access to the private key;
applying, at the gateway device, an operator to the encrypted data to compute a value of a function of the encrypted data without decrypting the encrypted data;
determining, at the gateway device, an action to be taken based on the value; and
taking the determined action.

2. The method according to claim 1, wherein determining the action comprises deciding whether or how to transmit the encrypted input-data to the operator and taking the determined action comprises transmitting or not transmitting the encrypted input data to the operator device based on the determination.

3. The method according to claim 1, comprising receiving instances of encrypted data from respective edge devices and computing a respective value of the function for each instance of encrypted data, wherein determining the action comprises selecting which instances of the encrypted data to transmit and, or how to transmit them based on the computed values and the action comprises transmitting selected one or more of the received instances of encrypted data based on the computed values.

4. The method according to claim 1, wherein the action comprises sending a control signal to the edge device and/or sending an alarm signal to the operator device.

5. The method according to claim 1, comprising receiving instances of encrypted data from respective edge devices and computing a respective value of the function for each instance of encrypted data and determining the action to be taken based on the computed values, wherein the action comprises sending a control signal to the edge device and/or sending an alarm signal to the operator device.

6. The method according to claim 1, wherein the edge device or devices comprise a video camera, the encrypted data comprises encrypted video data and encrypted motion data indicative of motion in frames of the video data and the function comprises a function of the motion data indicative of an amount of motion in frames of the video data.

7. The method according to claim 6, wherein the action comprises selecting a quality of video data to be transmitted to the operator based on the value.

8. The method according to claim 1, wherein the edge device or devices comprise a utility consumption meter and the encrypted data comprises utility consumption data.

9. The method according to claim 1, wherein the function comprises a sum.

10. The method according to claim 1, wherein the function returns a value indicating whether a sum of magnitudes of the data exceed a threshold value.

11. A method of local decision making in a communications system comprising an operator device in communication with a plurality of gateway devices and a plurality of edge devices, each edge device of the plurality of edge devices in communication with a respective gateway device of the plurality of gateway devices, the method comprising:
receiving encrypted data at a gateway device from an edge device for transmission to the operator device, wherein the encrypted data is encrypted with a public key such that the encrypted data can be decrypted with a corresponding private key and a function of the data can be computed without the private key, wherein the data is encrypted using functional encryption, and wherein the gateway device does not have access to the private key;
applying, at the gateway device, an operator to the encrypted data to compute a value of a function of the data without decrypting the encrypted data;
determining, at the gateway device, an action to be taken based on the value; and
taking the determined action.

12. A gateway device for use in a communications system comprising an operator device in communication with a plurality of gateway devices and a plurality of edge devices, each edge device of the plurality of edge devices in communication with a respective gateway device of the plurality of gateway devices, wherein each gateway device of the plurality of gateway devices comprises:
a memory storing computer instructions;
a communications interface for receiving encrypted data from an edge device and for transmitting the encrypted data to an operator device, wherein the encrypted data is encrypted with a public key such that the encrypted data can be decrypted with a corresponding private key and a function of the data can be computed without the private key, wherein the gateway device does not have access to the private key; and a processor configured to execute the computer instructions to:

apply an operator to the encrypted data to compute a value of a function of the data without decrypting the encrypted data;

determine an action to be taken based on the value, wherein determining the action comprises deciding whether or how to transmit the encrypted data to the operator; and take the determined action.

13. The gateway device according to claim 12, wherein connections between the gateway device and the plurality of edge devices have higher bandwidth and/or shorter latency than connections between the plurality of edge devices and the operator device.

* * * * *